United States Patent

[11] 3,573,493

[72] Inventor Gerhard Kamin
Traisa, Germany
[21] Appl. No. 838,424
[22] Filed July 2, 1969
[45] Patented Apr. 6, 1971
[73] Assignee Fernseh GmbH
Darmstadt, Germany
[32] Priority July 4, 1968
[33] Germany
[31] P 17 62 541.1

[54] SELECTION CIRCUIT FOR SELECTING PULSES FROM A PULSE SEQUENCE IN DEPENDENCE ON THE INTERPULSE INTERVAL THEREBETWEEN
8 Claims, 3 Drawing Figs.

[52] U.S. Cl. .................................................. 307/234,
307/246, 328/110, 328/112, 328/120, 328/129
[51] Int. Cl. .................................................. H03k 5/20
[50] Field of Search .................................................. 307/233,
234, 246; 328/110, 111, 112, 119, 120, 129

[56] References Cited
UNITED STATES PATENTS

| | | | |
|---|---|---|---|
| 2,577,827 | 12/1951 | Tompkins | 328/112 |
| 2,719,226 | 9/1955 | Gordon et al. | 328/129 |
| 3,138,759 | 6/1964 | Thompson | 307/234X |
| 3,497,815 | 2/1970 | Turner | 307/233X |

*Primary Examiner*—John S. Heyman
*Assistant Examiner*—R. C. Woodbridge
*Attorney*—Michael S. Striker

ABSTRACT: A capacitor as charged linearly with respect to time during the interpulse intervals of a pulse sequence and short circuited during the occurrence of the pulses. The voltage on the capacitor is supplied to a threshold circuit set to a predetermined threshold value. The output of the threshold circuit, shaped by a trigger circuit, is applied to a pulse width discriminator. The output of the pulse width discriminator comprises pulses corresponding to the input pulses to the discriminator when these input pulses exceed a predetermined width. The input pulse sequence and the output of the pulse width discriminator are applied to the inputs of an AND gate, at whose output thus appear those pulses for which the interpulse interval is less than a predetermined value.

Inventor:
Gerhard Kamin by Michael J. Striker
Attorney

SELECTION CIRCUIT FOR SELECTING PULSES FROM A PULSE SEQUENCE IN DEPENDENCE ON THE INTERPULSE INTERVAL THEREBETWEEN

CROSS REFERENCE TO RELATED APPLICATIONS

The subject matter of the present application is related to my application entitled "Pulse Width Discriminator," Ser. No. 824,393, filed May 9, 1969.

BACKGROUND OF THE INVENTION

This invention relates to a circuit for selecting pulses from an input pulse sequence having variable interpulse intervals, in dependence on said interpulse intervals.

The problem of separating pulses which closely follow one another from isolated individual pulses often occurs in data processing. As an example of this, television signals might be given, when these television signals result from the pickup of microscopic images of, for example, blood cells or alloys, when it is required that the particles which occur in clusters are counted and those which occur individually are ignored.

The same problem, namely the selection of pulses whose distance in time from the next sequential pulse is less than a predetermined time period, also exists in data transmission systems wherein the data are transmitted in pulse sequences having a relatively large interpulse interval and wherein single noise pulses may appear in said intervals.

SUMMARY OF THE INVENTION

This invention comprises a selection circuit for selecting, from an input pulse sequence having a variable interpulse interval, those pulses for which said interpulse interval is less than a predetermined time period.

The selection circuit of this invention comprises first circuit means adapted to receive said pulse sequence at a first circuit input. The first circuit means combines sequential pulses occurring with interpulse intervals less than said predetermined time period into a single pulse, here called a secondary pulse, having a secondary pulse width corresponding to the sum of the pulse widths of the so occurring sequential pulses and the interpulse intervals occurring between said pulses.

The secondary pulses are applied to a pulse width discriminator circuit connected to the output of the first circuit means. The pulse width discriminator circuit furnishes discriminator output pulses corresponding to secondary pulses having a secondary pulse width exceeding a predetermined pulse width. The output of this pulse width discriminator circuit, and the input pulse sequence are respectively applied to the second and first inputs of an AND gate. The output of this AND gate then furnishes an output pulse sequence corresponding to the input pulse sequence whenever the interpulse interval in said input pulse sequence is less than said predetermined time period. Alternatively, it might be stated that the pulses of the input pulse sequence are lengthened by the predetermined time period, and the so lengthened pulses, which thus form a single pulse are applied to the pulse width discriminator circuit, as described above.

In a slight variation of a preferred embodiment of this invention, it is also possible to select the single individual pulses, and to neglect pulses closely following one another.

If it is desired to select, from an input pulse sequence having variable interpulse intervals, those pulses for which the interpulse interval is larger than a predetermined time period, the pulses of the input pulse sequence may again be lengthened by said predetermined time period. The so lengthened pulses are again applied to a pulse width discriminator, at whose output appear only those pulses whose width exceeds a predetermined width. The output of this pulse width discriminator circuit is then inverted and the input pulse sequence and the inverted output of the pulse width discriminator circuit are applied respectively to the first and second input of an AND gate, at whose output then appear the selected pulses.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENT

A preferred embodiment of the invention will now be discussed in relation to the figures. Corresponding parts in all figures have the same reference number.

Figure 1:
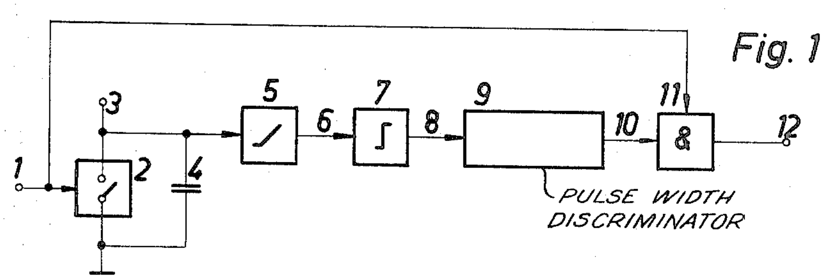
FIG. 1 is a circuit for selecting pulses having an interpulse interval less than a predetermined time interval.
Figure 2:
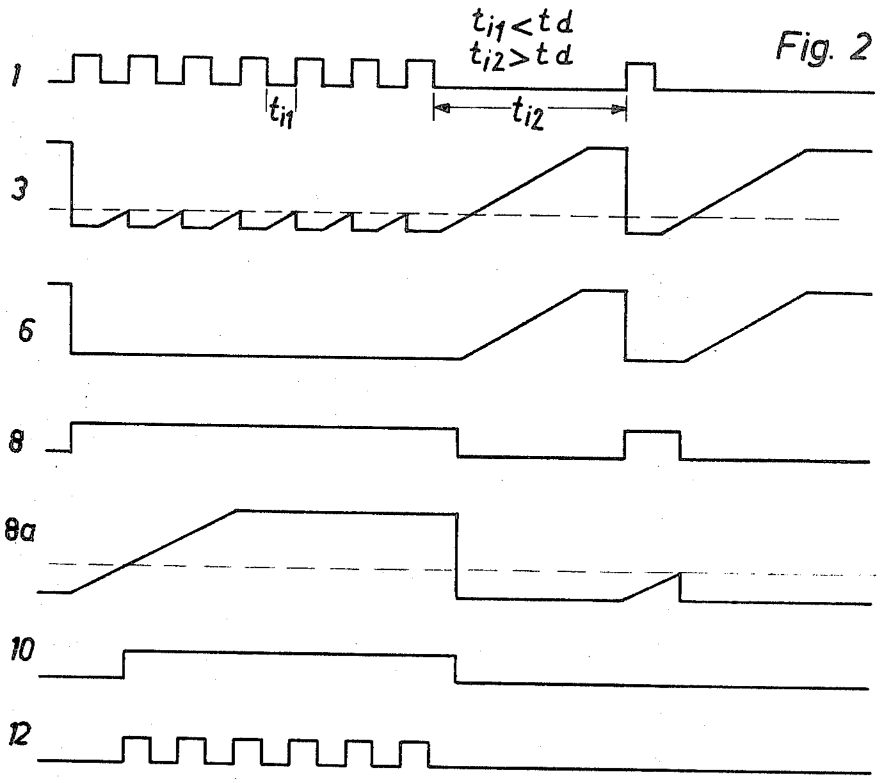
FIG. 2 is a diagram showing the variation of voltage with respect to time at selected circuit points of FIG. 1.

The pulse sequence of line 1 in FIG. 2 consists of a sequence of positive pulses the time interval between successive pulses being denoted by $t_i$. It will be noted that this interpulse interval is not constant. It is the time interval occurring between the trailing edge of one pulse and the leading edge of the pulse immediately following said pulse. The object of the circuit shown in FIG. 1 is to select from the pulse sequence shown in line 1 of FIG. 2 those pulses for which the above-identified interpulse interval is less than a predetermined time period. This predetermined time period is denoted by $t_d$, and, as indicated in FIG. 2, $t_{i1}$ is less than $t_d$, while $t_{i2}$ is greater than $t_d$. It is thus the function of the circuit shown in FIG. 1 to reproduce those pulses at the output 12 for which the interpulse interval $t_i$ is less than the predetermined time period, $t_d$. Pulses for which the interpulse interval is greater than $t_d$ are to be suppressed.

The pulse sequence shown in line 1 of FIG. 2 is applied to terminal 1 of FIG. 1 in such a manner that electronic switching means 2 are in a conductive condition during the occurrence of the pulses. The electronic switching means 2 are connected in parallel to a capacitor 4. One common terminal of the parallel circuit comprising the capacitor and the electronic switching means is connected to ground, while the other terminal is connected to a terminal numbered 3 in FIG. 1. At this terminal 3 a substantially constant current source is supplied. Thus, when the electronic switching means 2 are in a nonconductive condition, the capacitor 4 is charged substantially linearly with respect to time. The voltage on capacitor 4 is shown in line 3 of FIG. 2. It will be noted that for short interpulse intervals the capacitor 4 is charged to a relatively low voltage prior to being short circuited and thus discharged by electronic switching means 2. The longer the interpulse interval, the higher the voltage on the capacitor prior to its discharge by the subsequent pulse.

The voltage on capacitor 4 is applied to the input of the threshold circuit means 5. This circuit furnishes a threshold output voltage shown in line 6 of FIG. 2. It will be noted that for interpulse intervals less than $t_d$ the voltage on the capacitor does not reach the predetermined threshold value, and thus the threshold circuit means have a constant output voltage during that part of the pulse sequence wherein the interpulse interval is less than the predetermined time period. For interpulse intervals greater than $t_d$, the voltage on the capacitor exceeds the predetermined threshold value and the threshold output voltage, as shown in line 6 of FIG. 2, becomes substantially identical to the voltage across the capacitor 4. The threshold output voltage is applied to a trigger circuit numbered 7, the input to trigger circuit 7 being connected to the output of the threshold circuit means. The trigger circuit is a conventional circuit, as for example a Schmitt trigger, and will therefore not be shown in detail here. The same is true of the electronic switching means and the threshold circuit means. These are all conventional circuits readily available in handbooks or text books and will therefore not be further described herein.

The trigger circuit furnishes the rectangular pulses shown in line 8 of FIG. 2.

It will be noted that the pulses of the input pulse sequence have been effectively lengthened by the above circuitry by a pulse width corresponding to $t_d$. Alternatively it might be said that those pulses of the pulse sequence for which the interpulse interval was less than $t_d$ have been combined into a single rectangular pulse, since the lengthening of the pulses with a short interpulse interval causes them to overlap and become essentially a single pulse of a pulse width corresponding to the sum of the pulse width of all pulses added to the interpulse interval between all pulses for which said interpulse interval is less than the predetermined time period.

The rectangular pulses are then applied to a pulse width discriminator numbered 9 in FIG. 1, whose input is connected to the output of the trigger circuit. Pulse width discriminators are also known elements in the art. However, for use in this particular circuit, a pulse width discriminator as described in my copending application entitled "Pulse Width Discriminator," Ser. No. 824,393, filed May 9, 1969, is particularly appropriate. As described in detail in this copending application, the pulse width discriminator furnishes pulses corresponding to input pulses whenever the pulse width of the input pulses exceeds a predetermined pulse width. Pulses of less than a predetermined pulse width are suppressed. The circuit functions similarly to the circuitry of the present application. A capacitor appears at its input, which is in parallel with electronic switching means, and the parallel combination is fed by a substantially constant current source. However in that case, namely the case of the copending application, the capacitor is charged during the occurrence of the pulse, and discharged in the interpulse interval. The voltage on the discriminator input capacitor in parallel with the electronic switching means associated with this discriminator, which are not shown here, is shown in FIG. 8*a*. This voltage is then applied, similarly as shown in this application, to a threshold circuit and a Schmitt trigger circuit. The value of the threshold circuit in the pulse width discriminator 9 is set in such a manner that pulses at point 8 which have a pulse width corresponding to only a single pulse at line 1, are suppressed. The pulse width discriminator output shown at line 10 of FIG. 2 results.

The output of the pulse width discriminator and the input pulse sequence are then combined in a logic AND circuit having first and second inputs numbered 11 and 10 respectively, and an AND output numbered 12. Thus an output 12 results whenever an input is present at both inputs 10 and 11. Thus the wave form as shown in line 12 of FIG. 2 results. It is seen that the single pulse having a long interpulse interval separating it from the subsequent pulse, as shown as the rightmost pulse in line 1 of FIG. 2, has been suppressed, while the pulses of the input pulse sequence occurring with short interpulse intervals, or more specifically interpulse intervals less than the predetermined time period $t_d$ are reproduced at 12. Because of the effect of the threshold circuit in the pulse width discriminator 9, it will be noted that the first pulse of the closely spaced pulse sequence is missing. The fact that this first pulse is missing is unimportant in microscopic examinations, since the number of closely occurring pulses there is extremely high and the resulting error is therefore substantially negligible. Further, when it is required that the number of pulses transmitted is correct, as for example in data transmission systems, it is possible to insert a pulse prior to the word to be transmitted.

Figure 3:
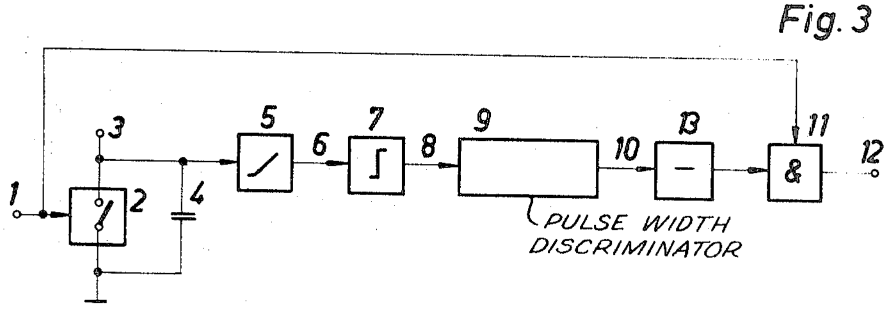
FIG. 3 is a preferred embodiment of a circuit for selecting pulses with interpulse intervals greater than a predetermined time period.

The circuit shown in FIG. 3 is identical to that shown in FIG. 1, except that an inverter, 13, is inserted between the output of the discriminator 9 and the input 10 to the AND gate. This allows pulses to be transmitted whose interpulse interval is less than the predetermined time period. Thus in the analysis of video signals only those pulses will be considered which occur individually, or at the beginning of closely bunched pulses.

While the invention has been illustrated and described as embodied in specific types of electronic circuits, it is not intended to be limited to the details shown, since various modifications and circuit changes may be made without departing in any way from the spirit of the present invention.

I claim:

1. Selection circuit for selecting, from an input pulse sequence having variable interpulse intervals, those pulses for which the interpulse interval is less than a predetermined time period, comprising in combination, first circuit means adapted to receive said pulse sequence at a first circuit input, for combining sequential pulses occurring with interpulse intervals less than said predetermined time period into a single secondary pulse having a secondary pulse width corresponding to the sum of the pulse widths of the so-occurring sequential pulses and the interpulse intervals occurring between said pulses; pulse width discriminator circuit means connected to the output of said first circuit means for furnishing discriminator output pulses corresponding to secondary pulses having a secondary pulse width exceeding a predetermined pulse width; logic AND circuit means having a first and second AND input and an AND output; and connecting means for applying said input pulse sequence to said first AND input and for connecting the output of said pulse width discriminator to said second AND input, whereby an output pulse sequence corresponding to said input pulse sequence will be furnished at said AND output, whenever the interpulse interval in said input pulse sequence is less than said predetermined time period.

2. Selection circuit for selecting, from an input pulse sequence having variable interpulse intervals, those pulses for which the interpulse interval is greater than a predetermined time period, comprising in combination, first circuit means adapted to receive said pulse sequence at a first circuit input, for combining sequential pulses occurring with interpulse intervals less than said predetermined time period into a single secondary pulse having a secondary pulse width corresponding to the sum of the pulse widths of the so-occurring sequential pulses and the interpulse intervals occurring between said pulses; pulse width discriminator circuit means connected to the output of said first circuit means for furnishing discriminator output pulses corresponding to secondary pulses having a secondary pulse width exceeding a predetermined pulse width; inverter circuit means connected to the output of said pulse width discriminator circuit means, for inverting said discriminator output pulses; logic AND circuit means having a first and second AND input and an AND output; and connecting means for applying said input pulse sequence to said first AND input and for connecting the output of said inverter circuit means to said second AND input, whereby an output pulse sequence corresponding to said input pulse sequence will be furnished at said AND output, whenever the interpulse interval in said input pulse sequence is greater than said predetermined time period.

3. Selection circuit as set forth in claim 1, wherein said first circuit means comprise a capacitor; a current source for charging said capacitor in accordance with a predetermined function of time; electronic switching means responsive to the pulses in said input pulse sequence, for short circuiting said capacitor in response to said pulses; and threshold circuit means connected to said capacitor for furnishing a threshold output voltage corresponding to the voltage on said capacitor when said voltage exceeds a predetermined threshold value, and a constant voltage when the voltage on said capacitor is less than said predetermined threshold values.

4. Selection circuit as set forth in claim 3, further comprising a trigger circuit connected to the output of said threshold circuit means for furnishing substantially rectangular pulses corresponding in width to said threshold output voltage to said pulse width discriminator circuit means.

5. Selection circuit as set forth in claim 4, wherein said current source charges said capacitor linearly with respect to time.

6. Selection circuit as set forth in claim 2, wherein said first circuit means comprise a capacitor; a current source for charging said capacitor in accordance with a predetermined function of time; electronic switching means responsive to the pulses in said input pulse sequence, for short circuiting said capacitor in response to said pulses; and threshold circuit means connected to said capacitor for furnishing a threshold output voltage corresponding to the voltage on said capacitor when said voltage exceeds a predetermined threshold value, and a constant voltage when the voltage on said capacitor is less than said predetermined threshold values.

7. Selection circuit as set forth in claim 6, further comprising a trigger circuit connected to the output of said threshold circuit means for furnishing substantially rectangular pulses corresponding in width to said threshold output voltage to said pulse width discriminator circuit means.

8. Selection circuit as set forth in claim 7, wherein said current source charges said capacitor linearly with respect to time.